United States Patent
Arazi et al.

(10) Patent No.: US 6,856,343 B2
(45) Date of Patent: *Feb. 15, 2005

(54) DIGITAL VIDEO LOGGING SYSTEM

(75) Inventors: Nitzan Arazi, Ramat-Hasharon (IL); Gilad Rosen, Herzlia (IL); Uri Sheffer, Tel-Aviv (IL)

(73) Assignee: Nice Systems Ltd., Raanana (IL)

( * ) Notice: Subject to any disclaimer, the term of this patent is extended or adjusted under 35 U.S.C. 154(b) by 121 days.

This patent is subject to a terminal disclaimer.

(21) Appl. No.: 09/987,310

(22) Filed: Nov. 14, 2001

(65) Prior Publication Data

US 2002/0030740 A1 Mar. 14, 2002

Related U.S. Application Data

(63) Continuation of application No. 09/307,718, filed on May 10, 1999, now Pat. No. 6,330,025.

(51) Int. Cl.[7] .............................................. H04N 7/18
(52) U.S. Cl. ................................................... 348/143
(58) Field of Search ........................... 375/240.01, 240; 348/143–159, 512, 513; 386/54, 104; H04N 7/18

(56) References Cited

U.S. PATENT DOCUMENTS

| | | |
|---|---|---|
| 3,686,434 A | 8/1972 | Lemelson |
| 3,811,008 A | 5/1974 | Lee |
| 4,673,974 A | 6/1987 | Ito et al. |
| 4,814,869 A | 3/1989 | Oliver, Jr. |
| 4,862,292 A | 8/1989 | Enari et al. |
| 4,920,424 A | 4/1990 | Hosaka et al. |
| 4,943,854 A | 7/1990 | Shiota et al. |
| 5,193,000 A | 3/1993 | Lipton et al. |
| 5,343,240 A | 8/1994 | Yu |
| 5,351,129 A | 9/1994 | Lai |
| 5,398,138 A | 3/1995 | Tomita |
| 5,526,133 A | 6/1996 | Paff |
| 5,544,290 A * | 8/1996 | Gentile ....................... 358/1.16 |
| 5,579,239 A | 11/1996 | Freeman et al. |
| 5,581,297 A | 12/1996 | Koz et al. |
| 5,642,285 A * | 6/1997 | Woo et al. .................. 348/148 |
| 5,923,365 A * | 7/1999 | Tamir et al. ................ 348/157 |
| 5,926,605 A | 7/1999 | Ichimura |
| 5,946,049 A * | 8/1999 | Cooper et al. .............. 348/513 |
| 6,002,427 A | 12/1999 | Kipust |
| 6,091,771 A | 7/2000 | Seeley et al. |
| 6,167,155 A * | 12/2000 | Kostrzewski et al. ....... 382/232 |
| 6,188,831 B1 | 2/2001 | Ichimura |
| 6,243,081 B1 * | 6/2001 | Goris et al. ................. 345/555 |
| 6,314,137 B1 * | 11/2001 | Ono et al. ............. 375/240.01 |
| 6,317,152 B1 * | 11/2001 | Hobson et al. ............. 348/150 |
| 6,330,025 B1 | 12/2001 | Arazi et al. |
| 6,347,114 B1 * | 2/2002 | Blanchard ................... 375/240 |
| 6,430,354 B1 * | 8/2002 | Watanabe .................... 386/46 |

* cited by examiner

*Primary Examiner*—Nhon Diep
(74) *Attorney, Agent, or Firm*—Eitan, Pearl, Latzer & Cohen Zedek, LLP

(57) ABSTRACT

A digital video logging system including a logging apparatus able to synchronize at least two digitally formatted video input and digital storage apparatus to store the digitally formatted input is provided.

13 Claims, 8 Drawing Sheets

| ENTRY | TYPE | SOURCE | LOGGER | CHANNEL | START TIME | STOP TIME |
|---|---|---|---|---|---|---|
| 1 | VIDEO | CAM 1 | 24302 | 1 | 4/29/99 16:00:34 | 4/29/99 17:21:01 |
| 2 | VIDEO | CAM 1 | 24302 | 2 | 4/29/99 16:00:34 | 4/29/99 17:21:01 |
| 3 | VIDEO | CAM 1 | 24302 | 3 | 4/29/99 16:00:34 | 4/29/99 17:21:01 |
| 4 | VIDEO | CAM 1 | 24302 | 4 | 4/29/99 16:00:34 | 4/29/99 17:21:01 |
| 5 | VIDEO | CAM 1 | 24302 | 5 | 4/29/99 16:00:34 | 4/29/99 17:21:01 |
| 6 | VIDEO | CAM 1 | 24302 | 6 | 4/29/99 16:00:34 | 4/29/99 17:21:01 |
| 7 | VIDEO | CAM 1 | 24302 | 7 | 4/29/99 16:00:34 | 4/29/99 17:21:01 |
| 8 | VIDEO | CAM 1 | 24302 | 8 | 4/29/99 16:00:34 | 4/29/99 17:21:01 |
| 9 | VIDEO | CAM 1 | 24302 | 9 | 4/29/99 16:00:34 | 4/29/99 17:21:01 |
| 10 | VIDEO | CAM 1 | 24302 | 10 | 4/29/99 16:00:34 | 4/29/99 17:21:01 |
| 11 | VIDEO | CAM 1 | 24302 | 11 | 4/29/99 16:00:34 | 4/29/99 17:21:01 |
| 12 | VIDEO | CAM 1 | 24302 | 12 | 4/29/99 16:00:34 | 4/29/99 17:21:01 |
| 13 | VIDEO | CAM 1 | 24302 | 13 | 4/29/99 16:00:34 | 4/29/99 17:21:01 |
| 14 | VIDEO | CAM 1 | 24302 | 14 | 4/29/99 16:00:34 | 4/29/99 17:21:01 |
| 15 | VIDEO | CAM 1 | 24302 | 15 | 4/29/99 16:00:34 | 4/29/99 17:21:01 |
| 16 | VIDEO | CAM 1 | 24302 | 16 | 4/29/99 16:00:34 | 4/29/99 17:21:01 |
| 17 | VIDEO | CAM 1 | 24302 | 8 | 4/29/99 16:00:34 | 4/29/99 17:21:01 |

FIG.6

DIGITAL VIDEO LOGGING SYSTEM

CROSS REFERENCE TO RELATED APPLICATION

This application is a continuation application of U.S. patent application Ser. No. 09/307,718 filed May 10, 1999 now U.S. Pat. No. 6,330,025.

BACKGROUND OF THE INVENTION

Surveillance systems employing video cameras and audio input devices are well known. In a typical system, some or all of the video and audio signals are provided on video screens and via speakers fox monitoring by security personnel. It is also known to record some or all of the analog video and audio signals on videotape for later retrieval. However, videotape suffers from serious drawbacks as a storage medium, particularly in view of the large quantity of video information generated by a surveillance system. A major concern is the sheer quantity of tapes to be stored, especially when it is desired to record signals generated by a large number of surveillance cameras. Moreover, in a large system many video tape recorders may be required, resulting in a large capital expenditure, the need to allocate space for the recorders, and the high maintenance costs of recorders due to their mechanical nature. Another problem is the need to frequently change tape cassettes. Degradation of the recording quality due to the wear on reused tapes is yet another problem.

Retrieving information of interest from recorded tapes presents additional challenges. It is the nature of video surveillance that a large part of the tape-recorded video surveillance signals is of no interest whatsoever, since it typically represents a static image of a field of view. Finding a particular sequence representing a significant event can be extremely difficult and time-consuming, requiring tedious human review of hours or days of tape-recorded signals, usually only after the event has occurred.

There have been a number of attempts to overcome these disadvantages, but so far with limited success, or at the cost of additional drawbacks, For example, it is known to multiplex and combine signals from multiple video cameras into a single image comprising multiple viewing windows within the image, each window corresponding to one of the cameras. Such multiplexing is based on decimating the frame rate of each of the video sources by a factor of N and combining N such decimated sources into a single video signal of a standard frame rate. This is called time-lapsed recording. However, each camera image in the multiplexed image must undergo compression that may reduce the quality of the recorded image. Also, recording of multiplexed images does not address the problems involved in finding sequences of interest on the recorded tapes. It is also known to record the surveillance video signals selectively in response to input from a human operator who is monitoring the signals or in response to signals generated by sensor devices arranged to detect events such as opening of doors or windows. This technique reduces the total information to be recorded, while preventing storage of much uninteresting information, but at the risk of failing to record significant events which cannot readily or timely be detected by sensors or human operators. Also, the reliance on external input can result in unreliability and increased expense, particularly where human operators are to initiate recording.

BRIEF DESCRIPTION OF THE DRAWINGS

The present invention will be understood and appreciated more fully from the following detailed description taken in conjunction with the appended drawings in which:

FIG. 6 is a simplified pictorial illustration of reporting provided by the digital video logging system of FIG. 1, constructed and operative in accordance with a preferred embodiment of the present invention.

DETAILED DESCRIPTION OF THE INVENTION

Figure 1:
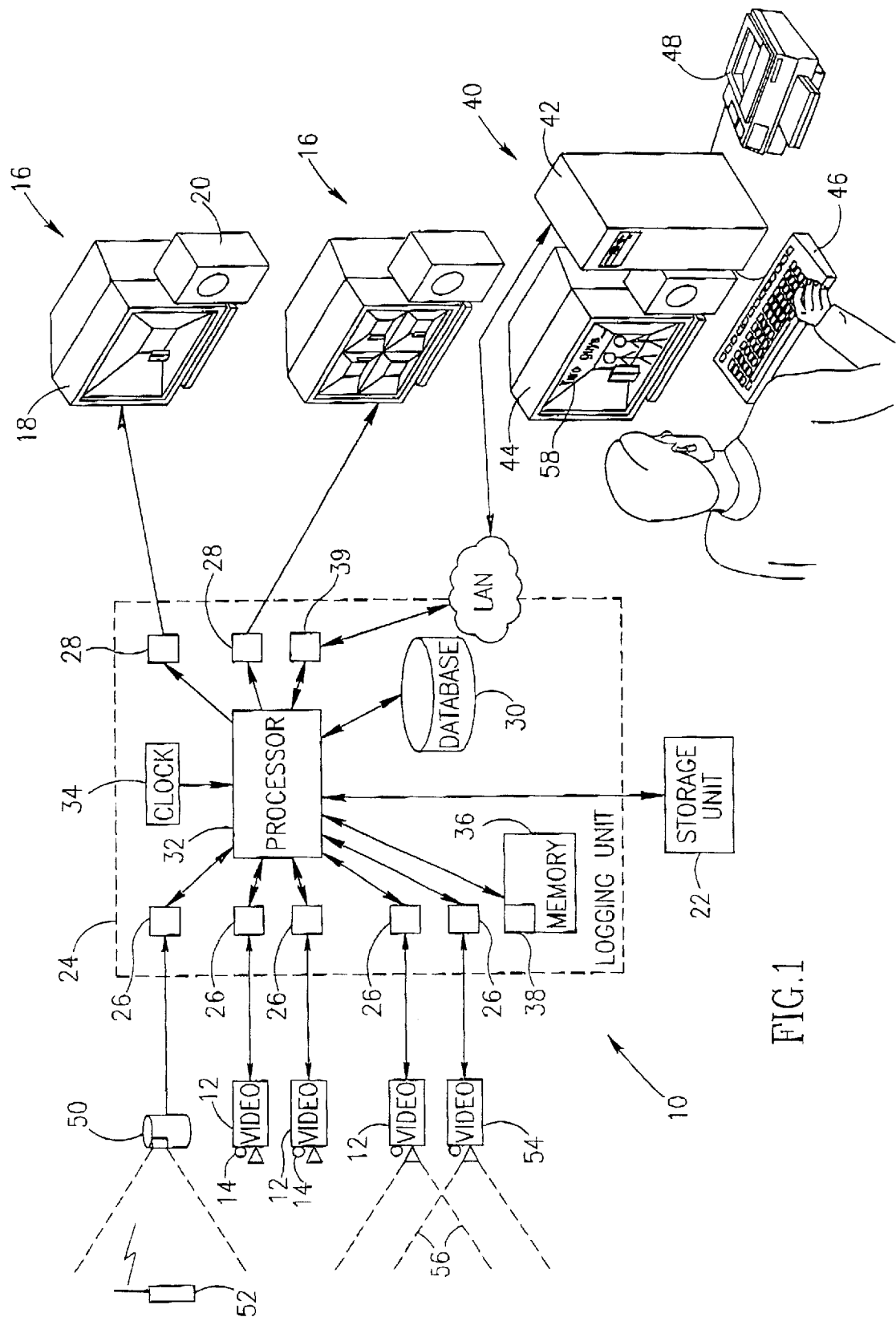
FIG. 1 is a simplified block diagram of a digital video logging system constructed and operative in accordance with a preferred embodiment of the present invention.

Reference is now made to FIG. 1 which is a simplified block diagram of a digital video logging system constructed and operative in accordance with a preferred embodiment of the present invention. The digital video logging system, generally designated 10, typically comprises a plurality of video input devices 12, being any commercially-available video camera that is capable of providing visible-light video input, as well as a plurality of audio input devices 14, being any commercially-available microphone or other audio input device. Each audio device 14 is shown assembled with video device 12, although it is appreciated that devices 12 and 14 need not be assembled as a single unit. System 10 also typically includes output apparatus 16, typically comprising a display 18 and one or more speakers 20, via which video and audio output may be provided. System 10 also typically comprises digital storage apparatus 22 for storing digitally formatted video and audio input. Storage apparatus 22 is preferably a combination of short-term storage, such as one or more hard disks, and long-term storage, such as one or more digital audio tapes (DAT) or advanced intelligent tapes (AIT).

System 10 also typically includes logging apparatus, generally designated 24, which receives inputs from video devices 12 and audio devices 14, converts analog video and audio inputs to digitally formatted input, synchronizes the digitally formatted inputs, stores some or all of the digitally formatted input to digital storage apparatus 22, and provides some or all of the digitally formatted input to output apparatus 16. Logging apparatus 24 typically communicates with devices 12 and 14 via interface circuitry 26, and with output apparatus 16 via interface circuitry 28. Also included in logging apparatus 24 is a database 30 for storing time, date, and other annotations relating to specific segments of recorded audio and video input.

Logging apparatus 24 also includes a microprocessor 32 for controlling any of elements 22, 26, 28, and 30 of apparatus 24. A clock 34 is also provided for use with microprocessor 32 as is well known, as is a memory 36 which is preferably a combination of read-only memory (ROM) for storing program instructions and random access memory (RAM) for storing program variables and video and audio inputs prior to moving the inputs to storage apparatus 22. Memory 36 also preferably includes a cyclic buffer 38 for storing video and audio inputs in FIFO fashion. Local area network (LAN) circuitry 39 is also provided for communication with one or more workstations and/or other external devices via a LAN.

System 10 also preferably includes one or more workstations 40 in communication with logging apparatus 24, either by direct connection or via LAN circuitry 39. Each workstation 40 typically comprises a computer 42, a display 44, a keyboard 46, and a printer 48, as well as other common workstation peripherals (not shown), and may serve as any of reporting, input retrieval, and annotation apparatus.

System 10 may also include one or more detection devices 50, such as a sound or motion detector, that can detect a non-ambient characteristic in a field of view and provide a signal relating to a detected non-ambient characteristic to logging apparatus 24. Detection device 50 may also detect the presence or absence of a signal in its field of view, the signal being transmitted by a transmitter 52, such as an electronic collar.

One or more forward-looking infrared (FLIR) cameras 54 may also be provided with system 10, each FLIR camera 54 preferably having a field of view that overlaps the field of view of a visible-light video input device 12, as illustrated by dashed lines 56.

The operation of system 10 and its various elements is now described in greater detail hereinbelow with respect to typical operational scenarios illustrated with additional reference to FIGS. 1–7.

Figure 2:
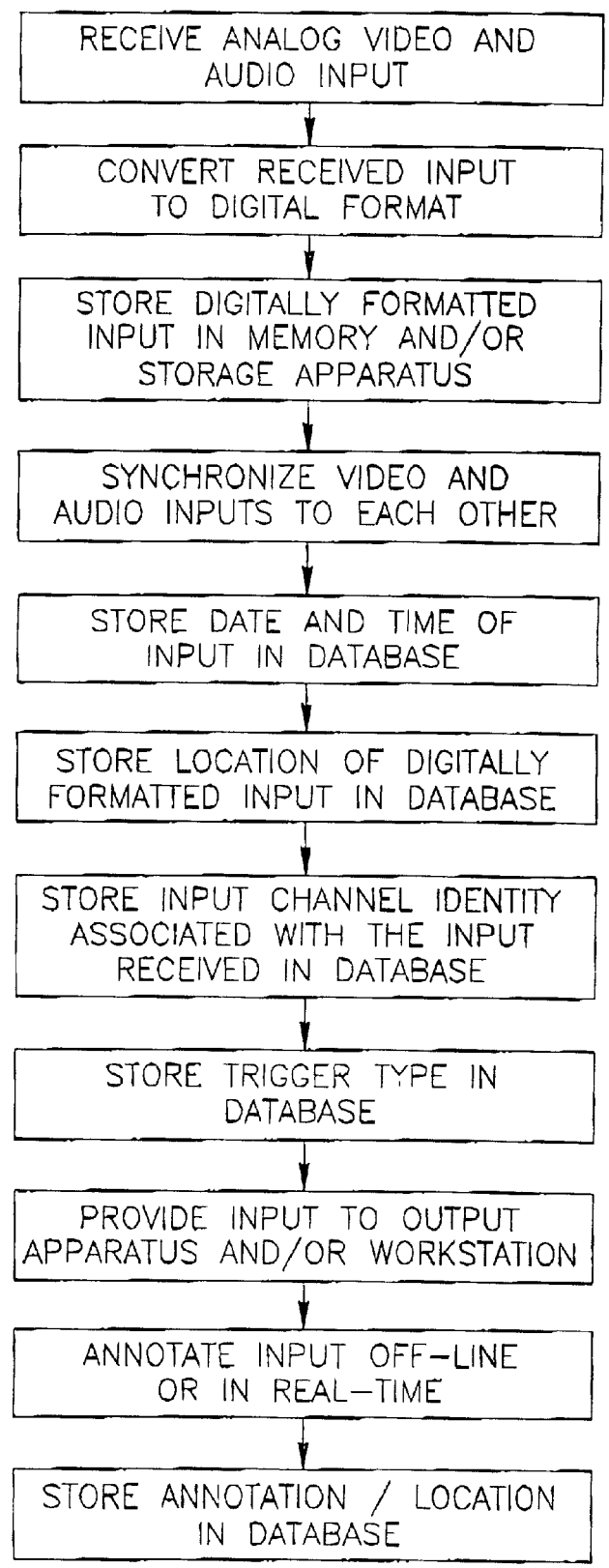
FIG. 2 is a simplified flowchart illustration of a method of operation of the digital video logging system of FIG. 1, the method being operative in accordance with a preferred embodiment of the present invention.

Reference is now made to FIG. 2 which is a simplified flowchart illustration of a method of operation of the digital video logging system of FIG. 1, the method being operative in accordance with a preferred embodiment of the present invention. In the method of FIG. 2 logging apparatus 24 receives analog video and audio inputs from video and audio input devices 12 and 14 via interface circuitry 26. Video and audio input may be received either continuously or periodically where logging apparatus 24 specifically activates a specific device 12 or 14 in order to begin receiving input therefrom. Periodic activation is controlled by microprocessor 32 acting as a scheduler in accordance with a predetermined activation schedule or scheduling algorithm maintained in digital storage 22, database 30, and/or memory 36. As is well known in the art, logging apparatus 24 may control power to devices 12 and 14, and may zoom, pan, and tilt video input devices 12. Activation of a device 12 or 14 may also be manually triggered by an operator via workstation 40.

Logging apparatus 24 converts the received video and audio inputs to digital format, optionally applying known compression techniques such as ITU-T H.261, ITU-T H.263 or wavelet-based video compression algorithms. Different input devices may have different types of compression and different compression ratios applied to inputs received therefrom in accordance with scheduling instructions or other predetermined instructions. The digitally formatted inputs may be stored in accordance with predetermined storage instructions in memory 36 and storage apparatus 22. Digitally formatted input may be first stored in memory 36, then transferred to hard disk, and later transferred to DAT or AIT. Video and audio inputs are preferably synchronized to each other by determining the date and time when each input is received using clock 34 and storing the date and time in database 30 along with the location of the stored digitally formatted input in storage apparatus 22. An input channel identified associated with the device 12 or 14 from which the input was received may also be stored in database 30 along with the location of the stored digitally formatted input in storage apparatus 22. The type of trigger, manual or scheduled, may likewise be stored in database 30.

As input is received from devices 12 and 14, logging apparatus 24 may provide any of the input to output apparatus 16 and/or workstation 40 in accordance with predetermined output instructions. Input received from two or more video input devices 12 may be combined to form a single image comprising multiple viewing windows within the image, each window corresponding to one of the input devices 12, and displayed via output apparatus 16 and/or workstation 40. An operator may use workstation 40 as annotation apparatus for annotating an input being displayed, either off-line or in real-time, such as is shown at reference numeral 58 (FIG. 1). Annotations are preferably stored in database 30 along with the location of the stored digitally formatted input in storage apparatus 22.

Figure 3A:
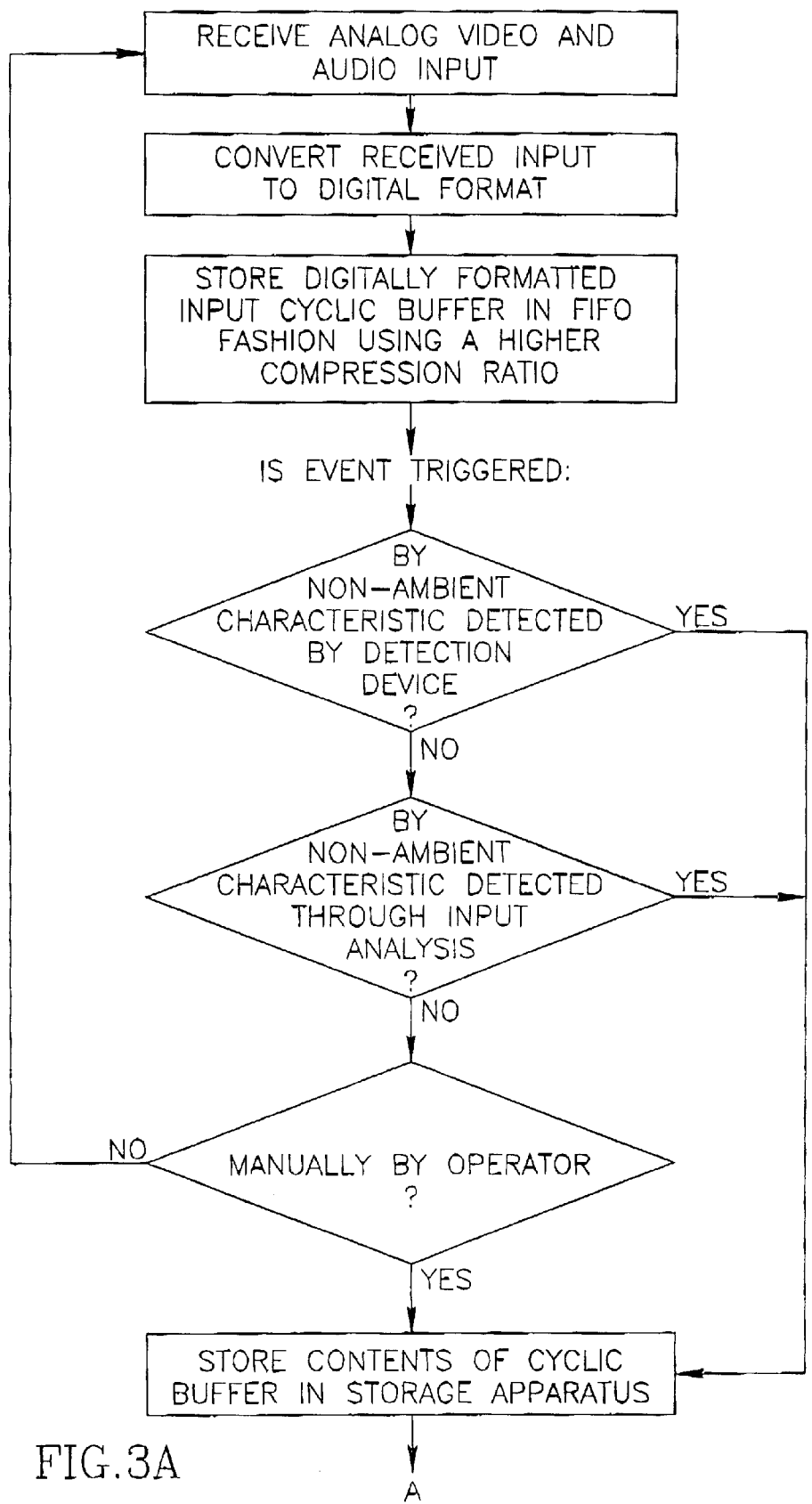
FIGS. 3A and 3B are a simplified flowchart illustration of a method of operation of the digital video logging system of FIG. 1 in response to a detected non-ambient characteristic, the method being operative in accordance with a preferred embodiment of the present invention.
Figure 3B:
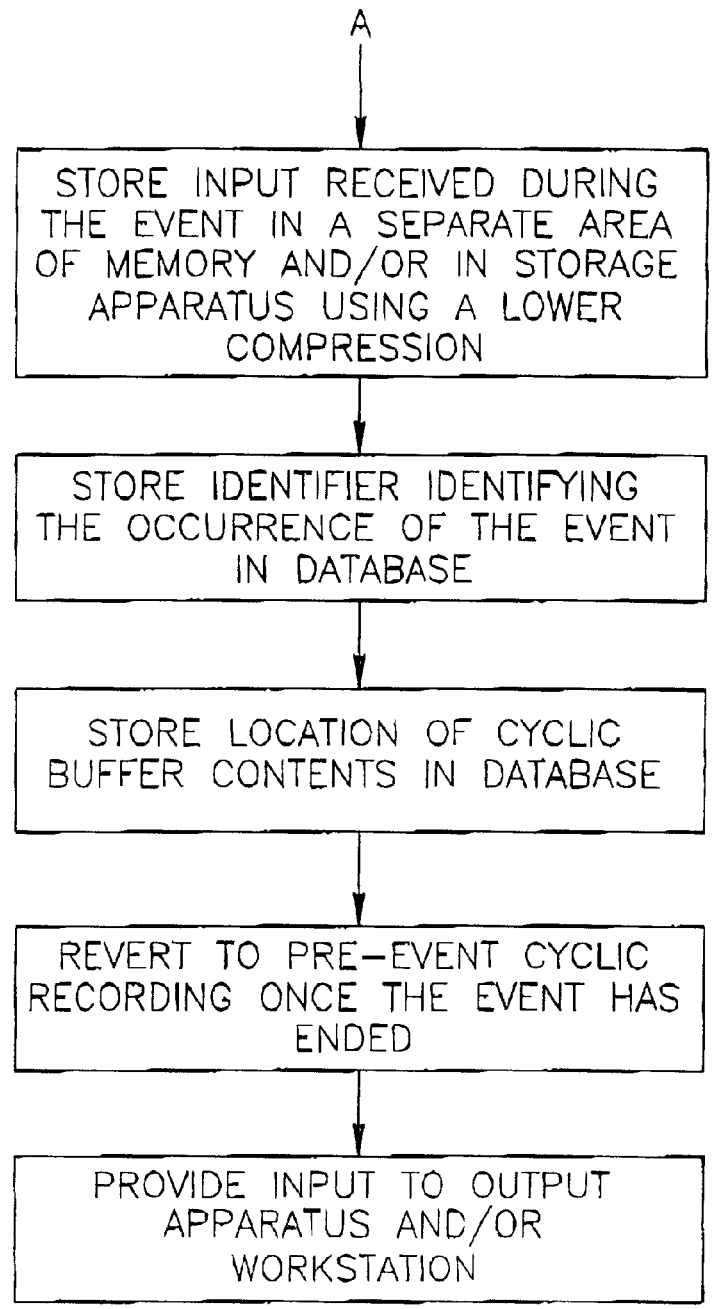

Reference is now made to FIGS. 3A and 3B which show a simplified flowchart illustration of a method of operation of the digital video logging system of FIG. 1 in response to a detected non-ambient characteristic, the method being operative in accordance with a preferred embodiment of the present invention. In the method of FIGS. 3A and 3B logging apparatus 24 receives and converts video and audio input from devices 12 and 14, converts the input to digital format, and stores the digitally formatted input in cyclic buffer 38 in FIFO fashion. Input that is to be stored in buffer 38 may be converted using a relatively high compression ratio. A separate cyclic buffer 38 may be maintained for each individual input device 12 and 14.

At some point, a non-ambient characteristic, such as motion, sound, heat, or a signal being transmitted by transmitter 52, is detected in a field of view of a specific device 12 or 14. The non-ambient characteristic may be detected by detection device 50 which then provides a signal indicating the detection to logging apparatus 24. Additionally or alternatively, the detection of motion, sound, or heat may be determined by logging apparatus 24 analyzing the video and audio input using known digital signal analysis techniques.

The detection of the non-ambient characteristic represents an "event" that is to be accorded a special significance relative to the input received prior to the event. As such, inputs received during the event are not stored to the cyclic buffer, but rather are stored in a separate area of memory 36 and/or in storage apparatus 22. Inputs received during the event are also typically stored using a lower compression ratio than that used for pre-event input. The contents of buffer 38 are also preferably stored in storage apparatus 22 at the relatively high compression ratio. An identifier identifying the occurrence of the event is preferably stored in database 30 along with the locations of the stored contents of buffer 38 and of the input received during the event and stored in storage apparatus 22. Logging apparatus 24 may revert back to pre-event cyclic recording once the event has ended, typically after a predetermined time has elapsed since the start of the event or after the event conclusion is signaled by an operator via workstation 40.

Upon detection of an event, logging apparatus 24 preferably provides the relevant audio and/or video input to output apparatus 16. Database 30 preferably contains a predefined set of rules that determines which inputs will be provided to which output apparatus 16 based on factors such as the time and date of the event, the device identity, the security level of the operator viewing the output, and the number of events that are already displayed on a particular output apparatus 16.

The device 12 or 14 in whose field of view the non-ambient characteristic is detected need not be the device 12 or 14 whose pre- and intro-event inputs are stored in association with the event. Indeed, an event detected with respect to the field of view of one device 12 or 14 may be used to trigger the recording of pre- and intro-event input from one or more other devices 12 or 14 instead of or in addition to the device where the event is detected.

An event may also be manually triggered by an operator via workstation 40, and the devices 12 and 14 for which event inputs are to be recorded and stored may also be manually specified. In this case an indication of the manually-triggered event may be stored in database 30 along with the location of the stored digitally formatted input in storage apparatus 22.

Figure 4:
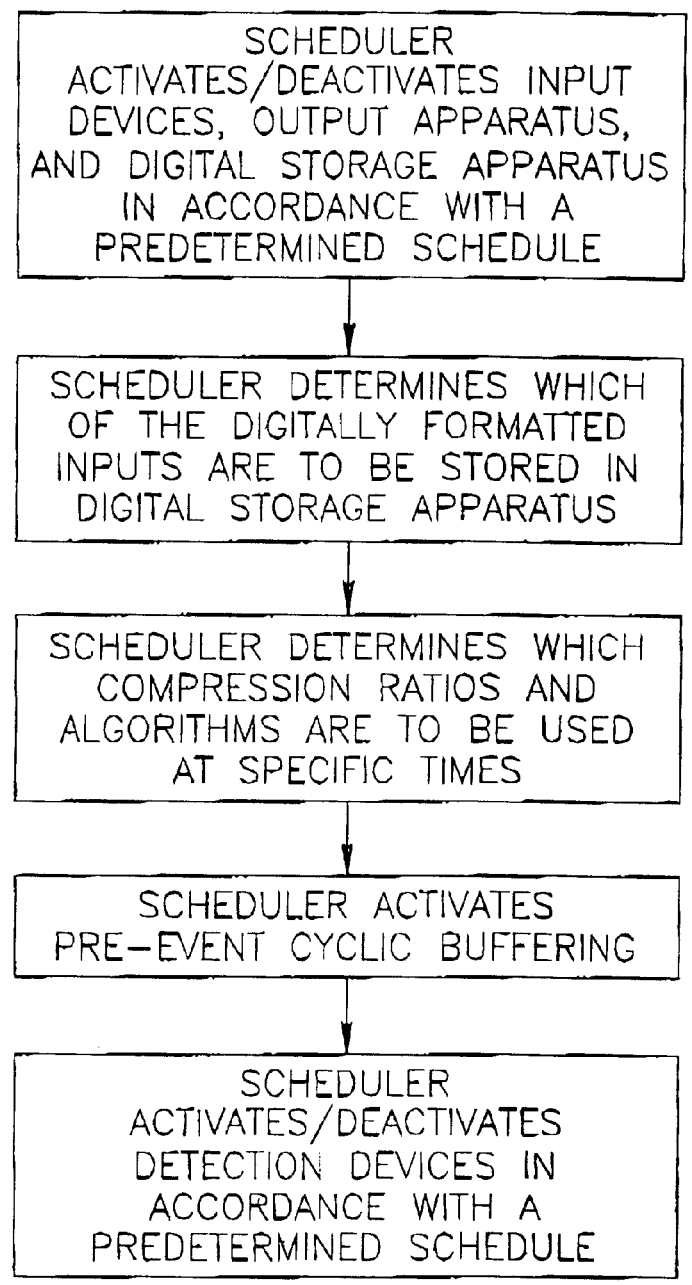
FIG. 4 is a simplified flowchart illustration of a method of scheduled operation of the digital video logging system of FIG. 1, the method being operative in accordance with a preferred embodiment of the present invention.

Reference is now made to FIG. 4 which is a simplified flowchart illustration of a method of scheduled operation of the digital video logging system of FIG. 1, the method being operative in accordance with a preferred embodiment of the present invention. In the method of FIG. 4 logging apparatus 24 continuously receives and converts video and audio input from devices 12 and 14. The decision regarding which inputs are to be converted to digital format and stored is controlled by microprocessor 32 in its role as scheduler as described hereinabove with reference to FIG. 2. Microprocessor 32, now also referred to as scheduler 32, may activate and deactivate any of the input devices 12 and 14, output apparatus 16, digital storage apparatus 22, and any other elements of logging apparatus 24 in accordance with a predetermined schedule. The schedule may determine which of the digitally formatted inputs are to be stored in digital storage apparatus 22, and may also determine which compression ratios and algorithms are to be used at specific times by any of the input devices 12 and 14, output apparatus 16, digital storage apparatus 22, and any other elements of logging apparatus 24. The scheduler may activate pre-event cyclic buffering as described hereinabove with reference to FIGS. 3A and 3B and may activate and deactivate detection devices 50 in accordance with a predetermined schedule.

Figure 5:
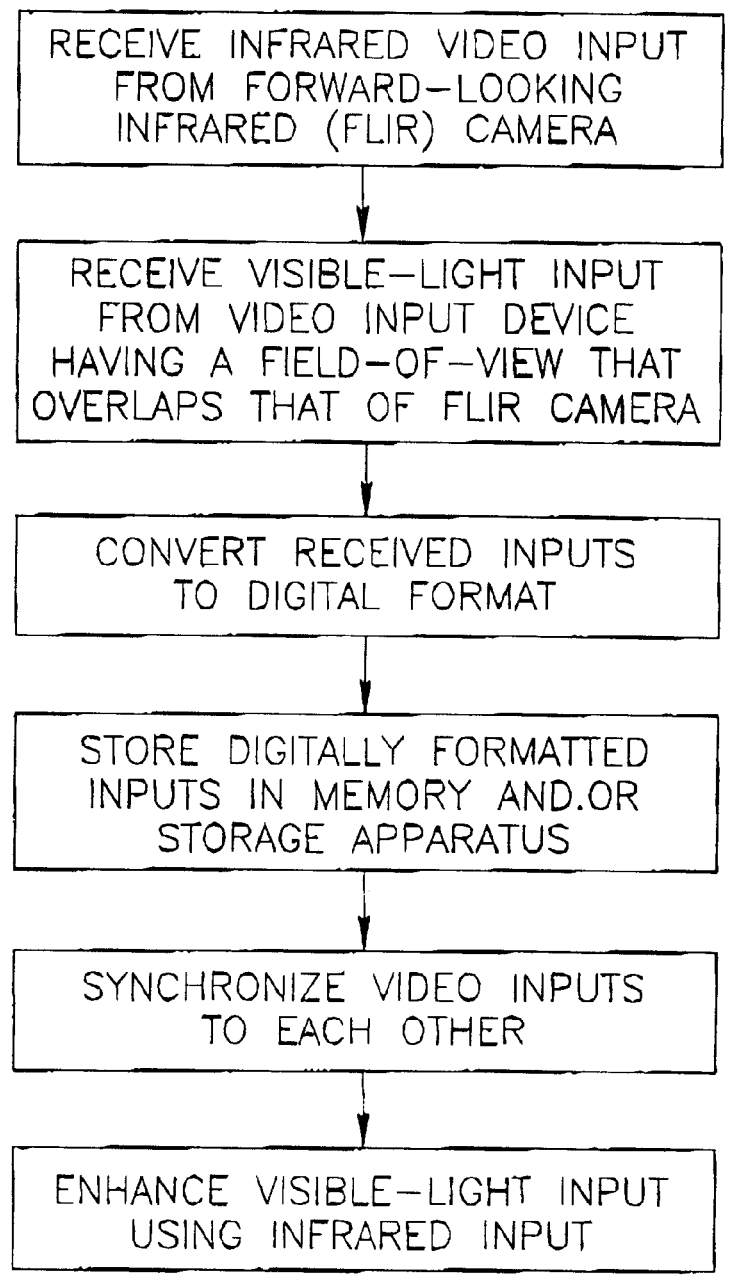
FIG. 5 is a simplified flowchart illustration of a method of FLIR operation of the digital video logging system of FIG. 1, the method being operative in accordance with a preferred embodiment of the present invention.

Reference is now made to FIG. 5 which is a simplified flowchart illustration of a method of FLIR operation of the digital video logging system of FIG. 1, the method being operative in accordance with a preferred embodiment of the present invention. In the method of FIG. 5 infrared video input is received from forward-looking infrared (FLIR) camera 54 and from visible-light video input device 12 where the fields of view of both device 12 and camera 54 overlap. The inputs are digitally converted, stored, and synchronized in the manner described hereinabove with reference to FIG. 2. The input from device 12 nay be enhanced using the input from camera 54 using known video enhancing techniques.

Reference is now made to FIG. 6 which is a simplified pictorial illustration of reporting provided by the digital video logging system of FIG. 1, constructed and operative in accordance with a preferred embodiment of the present invention. The illustrative report shown in FIG. 6 presents the input type, the source of the input, the input channel, and the start and stop times of the recording. Other information regarding inputs and may be provided via workstation 40 either in "real-time" as inputs are being received, off-line at a later time after inputs are received, as pop-up messages to the operator via display 44 regarding detected events, and/or as messages sent to a remote location via LAN, WAN, fax, pager, or pre-recorded telephone message.

Figure 7:
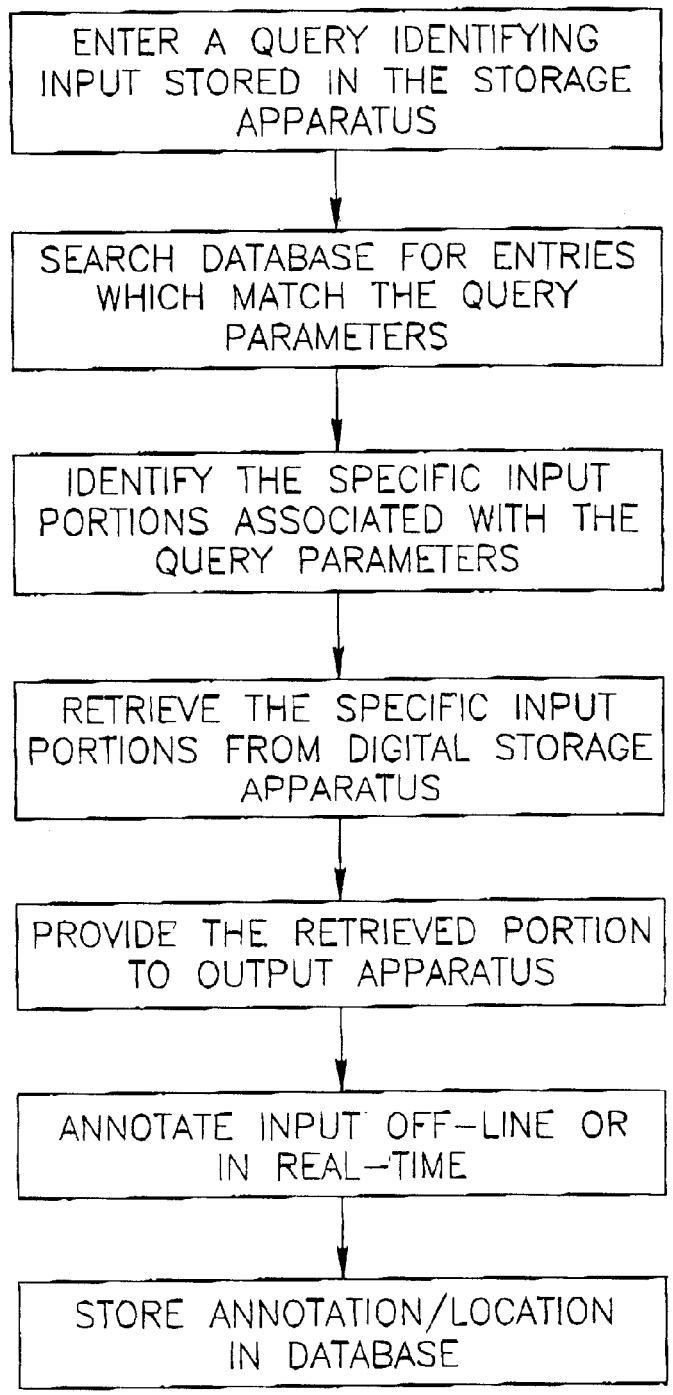
FIG. 7 is a simplified flowchart illustration of a method of input retrieval and playback operation of the digital video logging system of FIG. 1, the method being operative in accordance with a preferred embodiment of the present invention.

Reference is now made to FIG. 7 which is a simplified flowchart illustration of a method of input retrieval and playback operation of the digital video logging system of FIG. 1, the method being operative in accordance with a preferred embodiment of the present invention. In the method of FIG. 7 an operator uses workstation 40 as an input retrieval apparatus by entering a query including at least one datum related to any of the portions of the digitally formatted input stored in storage apparatus 22. Database 30 is searched for entries which match the query parameters and identifies the specific input portions associated with the query parameters. Workstation 40 then instructs logging apparatus 24 to retrieve the specific input portions from digital storage apparatus 22 and provide the portion to output apparatus 16 where they may be annotated in the manner described hereinabove with reference to FIG. 2.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method in operation of a surveillance system, the method comprising:

receiving video input from one or more video input devices and audio input from one or more audio input devices, said video input devices and said audio input devices coupled to a logging apparatus;

storing portions of said video input at different compression ratios; and synchronizing at least a portion of inputs received from one or more of said video input devices and from one or more of said audio input devices to each other.

2. The method of claim 1 further comprising selectively providing at least a portion of said video input to a storage apparatus.

3. The method of claim 1 further comprising selectively providing at least a portion of said video input to an output apparatus.

4. The method of claim 2 further comprising:

associating at least a portion of said video input with one or more data from a group including: an input channel datum, a time datum, a date datum, a non-ambient characteristic datum and a trigger datum; and storing said one or more data in a database.

5. The method of claim 4 further comprising:

accepting a query comprising at least one of said data;

retrieving at least said portion of said video input associated with at least one of said data; and providing at least said portion to an output apparatus.

6. The method of claim 1 further comprising:

detecting a non-ambient characteristic associated with at least a portion of said video input; and providing at least said portion to a storage apparatus subsequent to said non-ambient characteristic being detected.

7. The method of claim 1 further comprising selectively controlling said input video devices to provide said video input.

8. The method of claim 7, wherein controlling said input video devices comprises activating or deactivating said input video devices in accordance with a predetermined schedule.

9. The method of claim 7, wherein controlling said input video devices comprises determining which portions of said video input are to be stored in a storage apparatus.

10. The method of claim 7, wherein controlling said input video devices comprises determining which compression ratios are to be used at specific times.

11. The method of claim 1 further comprising:

receiving infrared video input from an infrared input device; and synchronizing at least a portion of inputs received from one or more of said video input devices and said infrared video input to each other.

12. The method of claim 1 further comprising:

receiving non-ambient input associated with a detected non-ambient characteristic from a detection device coupled to said logging apparatus.

13. The method of claim 12, wherein receiving said non-ambient input from said detection device comprises receiving a signal being associated with sound, motion, heat or being transmitted by a transmitter.

* * * * *